Patented Oct. 23, 1934

1,977,826

UNITED STATES PATENT OFFICE 1,977,826

COMPOSITIONS OF MATTER AND METHODS AND STEPS OF MAKING THE SAME

Mortimer T. Harvey, East Orange, N. J., assignor to The Harvel Corporation, a corporation of New Jersey No Drawing. Original application February 9, 1928, Serial No. 253,223. Divided and this application October 25, 1930, Serial No. 491,322

11 Claims. (Cl. 260—)

The present invention relates, generally, to materials which are resistant to water and moisture and have other desirable characteristics, and to the treatment of materials, objects, and articles particularly for rendering them or portions of them waterproof. More specifically, the invention relates to methods and materials in which cashew nut shell liquid is used in combination with alkaline materials to produce a new product and to produce water and moisture proofing coatings, impregnations, coverings and so on. The finished products of the invention have good electrical insulating qualities and are therefore useful as electrical insulation.

An object of the invention is to provide a method or methods for producing from cashew nut shell liquid and an alkaline material, new materials which have among other characteristics, that of resistance to moisture and water.

Other objects and advantages of the invention will be clear from the following description of the methods and materials of the invention; and the invention consists also in the methods and steps and in the materials and combinations and arrangements set forth in the accompanying claims.

I have discovered that the liquid which occurs naturally in the cellular structure of the shell of the cashew nut will combine with alkaline materials to produce materials which can be dried and can be formed into bodies and which are impervious to water and to moisture. Examples of the alkaline materials which can be used with cashew nut shell liquid to produce the materials of the invention are lime, plaster, cement, alumina, barium hydroxide, barytes, magnesia, sodium hydroxide, sodium carbonate, ammonium carbonate, and the like, in fact any material or substance which has an alkaline reaction.

As an example of materials which can be dried, which can be made into bodies, and which when dried are resistant to water and moisture and insoluble in alcohol, petroleum oils and other solvents, the following is given. Five parts by weight of cashew nut shell liquid are mixed thoroughly with three to four parts of barium hydroxide to produce a reaction product. This product is a liquid at first, but it will dry at normal or raised temperatures. Water is a product of the reaction, and the water can be removed before the product is used or else it can be dried therefrom in situ. This reaction, product can be used as a coating material for walls of cement, plaster, brick, wood and so on, for wood, cloth, felt and other tissue and fabrics. The reaction product can also be used for making molded parts either with or without filler materials such as ground slate, zinc oxide, wood pulp, hard rubber, barytes, iron oxide, and other well known materials. The reaction product can be applied as a finishing material because it forms a good film on drying and it can be used as a filler or primer preparatory to a coating of paint or varnish. The reaction product when first made is soluble in varnoline, gasoline, kerosene and so on and can be applied to surfaces and otherwise used with these solvents as vehicles. The solvent can be dried off either by natural evaporation in air at normal temperatures or under raised temperatures, and the remaining reaction product will dry in air.

The consistency of the product of reaction between barium hydroxide and cashew nut shell liquid varies with the proportions used. One part of barium hydroxide and nine parts of cashew nut shell liquid will give a reaction product which is scarcely thicker in consistency than the said liquid alone; with equal parts of these materials a product that is doughy; both these products, as well as products made of intermediate and other proportions, are soluble in kerosene, varnoline, gasoline and the like, and these products whether used or applied with or without a solvent will dry in air at normal temperatures.

These materials can be used, in addition to other uses, as fillers for surfaces to be painted, and they will protect the paint from passage of moisture thereto from walls to which they are applied, such as concrete walls or floors.

As an example of water proofing applications, five parts by weight of commercial cashew nut shell liquid is intermixed with ninety-five parts of hydraulic cement, such as Portland cement, water being also intermixed in the well known manner and proportions to work the cement and to give it a set when applied. The mixture is applied as soon as mixed as is usually done. The cashew nut shell liquid reacts with alkaline materials in the cement to produce a product which prevents the passage of moisture or of water.

Instead of intermixing the cashew nut shell liquid with the hydraulic cement the said liquid can be applied to the surface of an object, article, or wall made of the cement to produce at the surface a coating or layer of the resulting water and moisture proof product which results from the reaction of the cashew nut shell liquid and alkaline ingredients in the cement. In this method the cashew nut shell liquid can be used alone or with a vehicle or carrier. The cashew nut shell liquid applied to a wall of cement penetrates thereinto and as a consequence the water proofing reaction material is produced in a layer that is more than superficial; and the distance of penetration and thickness of the water proof layer about one quarter of an inch.

Quite small quantities or amounts of the cashew nut shell liquid are required to produce practical layers of water proofing product and I find that the said liquid can be applied in economical quantities by means of a liquid vehicle carrier, which latter can be either a solvent or nonsolvent of the cashew nut shell liquid. As solvent vehicles, for example, hydrocarbons can be used, for particular examples, varnoline, gasoline, and kerosine. A practical example is a solution of fifty parts by weight of commercial cashew nut shell liquid in fifty parts of commercial varnoline. The solution can be applied by brush, spray, by dipping, or by means or methods well known in liquid applying.

The cashew nut shell liquid either alone or in a solvent as above described or in an emulsion as hereinafter described can be applied as well to walls or surfaces of plaster, calcimine, magnesia or magnesite materials, baria and barytes and other alkaline materials as to the cement walls or surface and in the same or similar manner. Cloth, paper, cardboard, tar paper, felt and other fabrics and tissues can be impregnated with alkaline material and the cashew nut shell oil applied thereto either alone, in solution, or in emulsion to produce therein the water and moisture proofing material of the invention. The fabric or tissue impregnated with the alkaline material, for example, by means of a water solution thereof, and the water of the solution can be dried therefrom after application, either before or after the cashew nut shell liquid application is made.

Articles, blocks, veneers, and other forms of wood can be water and moisture proofed in the manner and by the means above set forth for fabrics and tissues.

Emulsion of cashew nut shell liquid can be made in water and the emulsion applied by brush, spray or other method or means. Various proportions of cashew nut shell liquid to water can be used, for example, ten parts by volume of said liquid can be used to ninety parts of water and the mixture stirred or agitated to produce the emulsion.

Alkaline material can be added to the water with which the cashew nut shell liquid is emulsified, for the purpose of reacting therewith to produce a water proofing product. The rate of reaction is such that the product can be formed in place after application, in such a case the alkaline material can be completely in solution or partly in solution and partly in suspension in the water. When there is alkaline material in the water with the cashew nut shell liquid a greater quantity of the cashew nut shell liquid can be emulsified with a given quantity of water.

The material of the invention is insoluble in water, of course, and is also insoluble in ordinary solvents such as kerosine, gasoline, alcohol and the like.

This application is a division of Serial No. 253,223, now Patent 1,838,075.

What I claim as my invention and desire to protect by Letters Patent is:

1. A material having the characteristics of imperviousness to water and being a reaction product of cashew nut shell liquid and an alkaline material to substantially completely react with the free acid and any glyceride thereof.

2. A dry, hard, water-proof reaction product of cashew nut shell liquid and an alkaline compound of an alkaline earth metal.

3. The reaction product of cashew nut shell liquid and an alkaline compound of barium.

4. A dry, water-proof molded composition made of the reaction product of cashew nut shell liquid and an alkaline material.

5. A dry, water-proof composition comprising the reaction product of cashew nut shell liquid and hydraulic cement.

6. A water resistant molded composition comprising a dry reaction product of cashew nut shell liquid and hydraulic cement.

7. A dry, water resistant and water proof reaction product of cashew nut shell liquid and material selected from the group consisting of lime, plaster, hydraulic cement and barium hydroxide.

8. A reaction product of cashew nut shell liquid and an alkaline material, the latter comprising forty per cent or more of the total of cashew nut shell liquid and alkaline material.

9. The method which comprises bringing cashew nut shell liquid and a material reactive therewith together in an emulsion with water.

10. The method which comprises bringing cashew nut shell liquid and a material reactive therewith together in an emulsion with water and heating to remove the water from the resulting product.

11. The method which comprises bringing cashew nut shell liquid and an alkaline material together in an emulsion with water.

MORTIMER T. HARVEY.